July 18, 1967  F. J. CONRAD  3,332,078
RADAR SIGNAL SIMULATOR
Filed Jan. 18, 1966
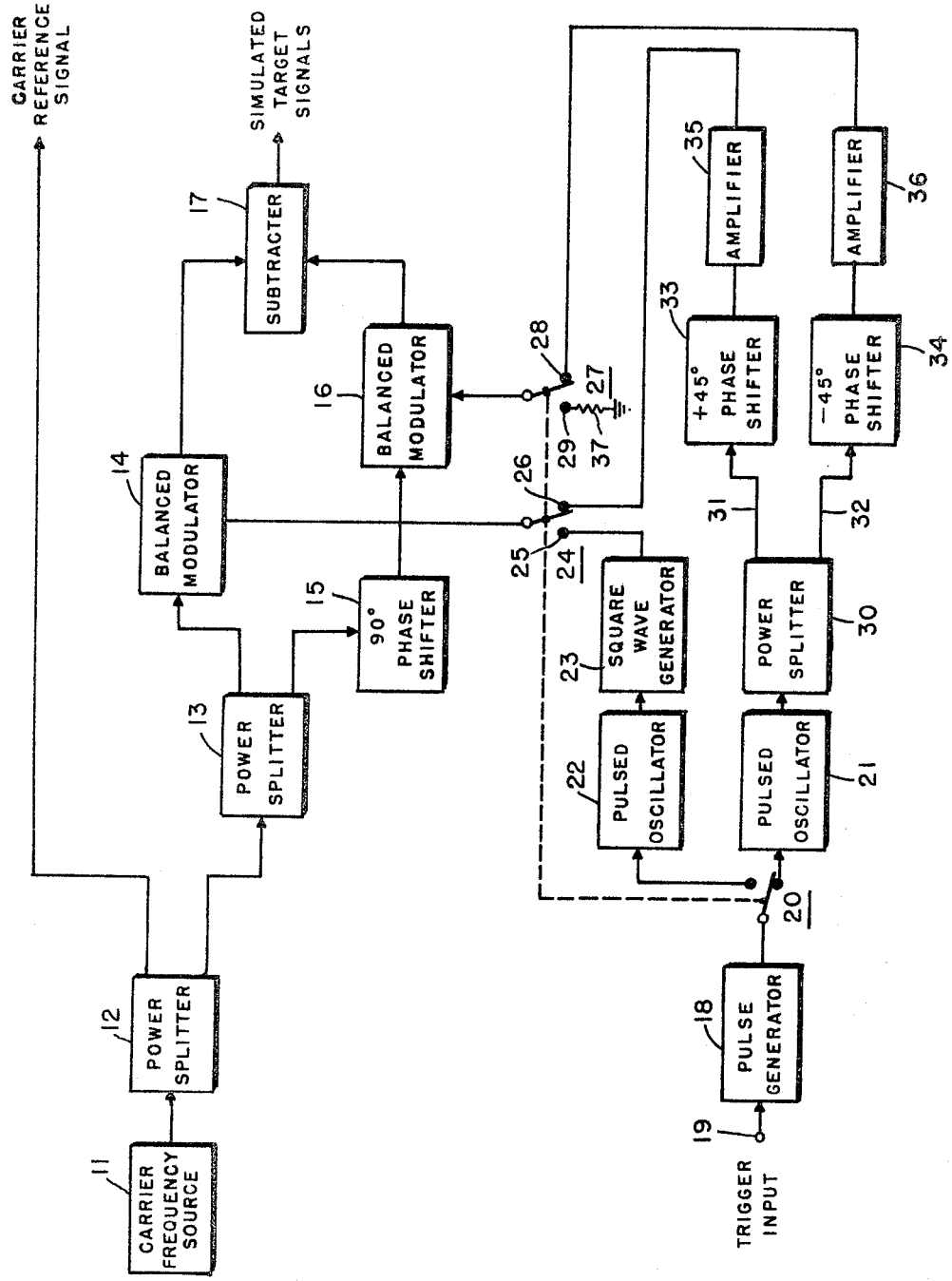
INVENTOR,
FREDERICK J. CONRAD
BY Harry M. Saragovitz,
Edward J. Kelly, Herbert Berl
& Julian C. Keppler
ATTORNEYS United States Patent Office 3,332,078
Patented July 18, 1967

3,332,078
RADAR SIGNAL SIMULATOR
Frederick J. Conrad, Baltimore, Md., assignor, by mesne assignments, to the United States of America as represented by the Secretary of the Army
Filed Jan. 18, 1966, Ser. No. 521,460
8 Claims. (Cl. 343—17.7)

ABSTRACT OF THE DISCLOSURE

A radar signal simulator for producing a simulated Doppler signal. A carrier frequency source is applied to a divider circuit. One of the two outputs from the divider is applied directly to a first balanced modulator and the other output of the divider is applied to a second balanced modulator through a 90° phase shifter. One of two different signals is used as a modulating signal. One type of modulating signal is a square wave that is applied to the first modulator while the modulating signal input of the second modulator is connected to ground through a resistance. The second type of modulating signal is a pulsed sinusoid. Pulsed sinusoid modulating signals are applied to the first modulator through a +45° phase shifter and to the second modulator through a −45° phase shifter. The output from each modulator is connected to a subtractor circuit. When the modulating signal is a square wave, the output from the subtractor is a simulated pulsed-carrier return. When the pulsed sinusoid is used as the modulating signal, the output of the subtractor is a simulated frequency-shifted target return.

Background of the invention

This invention relates to Doppler signal simulators and more particularly to signal generators for simulating either pulsed frequency-shifted target returns or conventional pulsed-carrier target returns.

Previous methods of frequency shifting to produce a simulated Doppler signal involve heterodyning a carrier signal and a lower frequency signal and filtering out a sideband as the shifted signal; serrodyning a traveling wave tube carrier amplifier with a sawtooth waveshape applied to the helix; and direct frequency or phase modulation at low frequencies followed by frequency multiplication. The first method is very inefficient at high carrier frequencies with small frequency shifts, necessitating very stable carrier frequency sources and filters of very small fractional bandwidths, and it often involves repetition of the heterodyning and filtering process. The serrodyne technique is expensive to instrument and is useable only in the range where traveling wave tubes are available, i.e., the microwave region to an upper limit of perhaps 18 kilomegacycles. The multiplication approach requires a long chain of multiplier stages at the expense of reliability, decreased signal to noise ratio, and reduced bandwidth.

Summary of invention

It is therefore an object of this invention to provide a radar signal simulator which produces a simulated Doppler effect by a method of much less complexity and cost than those previously used.

A further object of this invention is to provide a Doppler signal simulator which can be utilized at higher frequencies than most of the prior art methods.

Another object of this invention is to provide a Doppler signal simulator which possesses an increased reliability that is inherent in its reduced complexity.

Brief description of drawing

Other objects and advantages of this invention will become apparent from the detailed description of the invention given in connection with the drawing in which the single figure is a block diagram of a preferred embodiment of the invention.

Description of preferred embodiment

Referring now to the figure there is shown a carrier frequency source 11, the output of which is connected to a power splitter 12. One of the outputs from power splitter 12 is used as a carrier reference signal in a radar set (not shown) being tested while the second output therefrom is connected to a second power splitter 13. The power splitter 13 has two outputs, one being directly connected to a balanced modulator 14, the other being connected through a 90 degree phase shifter 15 to a second balanced modulator 16. The outputs from the two modulators are coupled to a subtractor circuit 17, the output of which is the simulated target signal.

The modulation input to the above described modulator circuit can be either of two different types depending upon the type of simulated target signals desired. A pulse generator 18 is triggered by pulses applied to a terminal 19. The output of the pulse generator is connected to the movable contact of a switch 20 which contains two fixed contacts, one of which is connected to a pulsed oscillator 21 and the other to a pulsed oscillator 22. The output from oscillator 22 is connected to a square wave generator 23, the output of which is connected to a fixed contact 25 of switch 24. The movable contact of switch 24 is connected to the modulation signal input of modulator 14. The output of oscillator 21 is split into two paths 31 and 32 by a power splitter 30, path 31 being connected to an amplifier 35 by a +45 degree phase shifter 33 and path 32 being connected to an amplifier 36 by a −45 degree phase shifter 34. The output of amplifier 35 is connected to a contact 26 of a switch 24 while the output of amplifier 36 is connected to a contact 28 of a switch 27. The movable contact of switch 27 is connected to the modulation signal input of modulator 16, and a fixed contact 29 is connected to ground by a resistor 37. Switches 20, 24 and 27 are ganged as shown by the dashed line.

When the switches are in the position shown, a pulsed sinusoid is applied in phase quadrature to the modulation input terminals of the modulators 14 and 16. This is caused by shifting the output signals from the pulsed oscillator 21 by +45 degrees and −45 degrees and applying the resulting signals to the modulators. The resultant output from the subtractor 17 is a pulsed, frequency shifted target return, the frequency of which depends on the frequency of oscillator 21.

When switches 20, 24 and 27 are in the position opposite the one shown, the modulation input terminal of modulator 14 is connected to the square wave generator 23, while the modulation input terminal of modulator 16 is connected to ground by the resistor 37. The video pulse modulating signal applied to modulator 14 from the square wave generator 23 will produce a pulsed simulated target return having a carrier center frequency.

The following specific example is intended to augment the description of this invention and not to limit the scope thereof. A simulator incorporating the above described invention was designed to evaluate a specific 35 kilomegacycle radar system. It produced pulsed RF outputs at the carrier center frequency, 35K m.c., or pulsed RF outputs at center frequencies shifted from the carrier as little as 100 kilocycles to several megacycles. The RF pulses at the carrier center-frequency are from 200 to 40 nanoseconds in duration.

The radar signal simulator disclosed hereinabove possesses greater simplicity and flexibility than those in the prior art by utilizing the phase shift modulation technique in a novel manner as both a frequency shifting pulse modulator and a carrier-frequency pulse modulator.

What is claimed is:

1. A radar signal simulator comprising: first and second balanced modulators each having a carrier signal input terminal and a modulation signal input terminal; means for applying a carrier frequency signal to both of said modulator carrier signal input terminals in phase quadrature; subtractor means connected to the outputs of said modulators, the output from said subtractor means being a simulated target signal; and modulation signal generating means connected to said modulator modulation input terminals for applying thereto either a pulsed sinusoid which is applied to said first and second modulators in phase quadrature, or a video pulse which is applied to only one of said modulators.

2. A radar signal simulator as set forth in claim 1 wherein said modulation signal generating means comprises means for producing a video pulse modulating signal; means for producing two pulsed modulating signals which are of the same frequency and in phase quadrature; and switch means for connecting either said video pulse modulating signal to one of said modulators or said phase quadrature modulating signals to both of said modulators.

3. A radar signal simulator as set forth in claim 1 wherein said modulation signal generating means comprises first and second pulsed oscillators; means connected to said pulsed oscillators to apply trigger pulses thereto; square wave generator means connected to said first pulsed oscillator for producing a video pulse modulating signal; means connected to said second pulsed oscillator for splitting the output therefrom into two equal parts; means connected to said last mentioned means for shifting the phase of said two equal parts so that they are in phase quadrature; and switch means for connecting either said video pulse modulating signal to one of said modulators or said phase quadrature signals to both of said modulators.

4. A radar signal simulator comprising: first and second balanced modulators each having a carrier signal input terminal and a modulation signal input terminal; means for applying a carrier frequency signal to both of said modulator carrier signal input terminals in phase quadrature; subtractor means connected to the outputs of said modulators, the output from said subtractor means being a simulated target signal; first and second pulsed oscillators; means connected to said pulsed oscillators for applying trigger pulses thereto; a square wave generator connected to the output of said first pulsed oscillator; means for splitting the output of said second pulsed oscillator into two equal signals; means for shifting the phase of said two equal signals so that they are in phase quadrature; and switch means for connecting either said square wave generator to one of said modulators or said phase quadrature signals to both of said modulators.

5. A radar signal simulator comprising: first and second balanced modulators each having a carrier signal input terminal and a modulation signal input terminal; a carrier frequency source; means for splitting the output of said carrier frequency source into first and second paths, said first path being available as a carrier reference source in a radar set under test; a power splitter connected to said second path, one of said power splitter outputs being directly connected to the carrier signal input terminal of said first modulator; a ninety degree phase shifter connected between the second output of said power splitter and the carrier signal input terminal of said second modulator; subtractor means connected to the outputs of said modulators, the output from said subtractor means being a simulated target signal; and modulation signal generating means connected to said modulators for applying thereto either a pulsed sinusoid which is applied to said first and second modulators in phase quadrature, or a video pulse which is applied to only one of said modulators.

6. A radar signal simulator comprising: first and second balanced modulators each having a carrier signal input terminal and a modulation signal input terminal; a carrier frequency source; means for splitting the output of said carrier frequency source into first and second paths, said first path being available as a carrier frequency reference source in a radar set under test; a power splitter connected to said second path, one of said power splitter outputs being directly connected to the carrier signal input terminal of said first modulator; a ninety degree phase shifter connected between the second output of said power splitter and the carrier signal input terminal of said second modulator; first and second pulsed oscillators; means connected to said pulsed oscillators for applying trigger pulses thereto; a square wave generator connected to the output of said first pulsed oscillator; means for splitting the output of second pulsed oscillator into two equal signals; means for shifting the phase of said two equal signals so that they are in phase quadrature; and first switch means for connecting either said square wave generator to the modulation terminal of said first modulator or said phase quadrature signals to the modulation terminals of both of said modulators.

7. The radar signal simulator as set forth in claim 6 which further comprises resistive means connected to said switch means for grounding the modulation signal input terminal of said second modulator when said square wave generator is connected to said first modulator.

8. The radar signal simulator is set forth in claim 6 wherein said trigger pulse means comprises a pulse generator; and second switch means connected to the output of said pulse generator for connecting the output thereof to said first pulsed oscillator when said square wave generator is connected to said first modulator and for connecting the output of said pulse generator to said second pulsed oscillator when said phase quadrature signals are connected to said modulators.

No references cited.

RODNEY D. BENNETT, *Primary Examiner.*

T. H. TUBBESING, *Assistant Examiner.*